United States Patent
Ander et al.

(10) Patent No.: US 9,691,038 B2
(45) Date of Patent: Jun. 27, 2017

(54) METHOD AND APPARATUS FOR EXAMINING WORKFLOW PROCESSES

(75) Inventors: S. Dale Ander, Dallas, TX (US); Michael G. Christiansen, Plano, TX (US); Ashish Rajput, Euless, TX (US); Palanisamy Gounder, Irving, TX (US); Guy Briggs, Coppell, TX (US); Thurman Pylant, Priddy, TX (US); Lalit Pant, Irving, TX (US); Jason Randall, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 1782 days.

(21) Appl. No.: 11/556,397

(22) Filed: Nov. 3, 2006

(65) Prior Publication Data
US 2008/0109268 A1    May 8, 2008

(51) Int. Cl.
*G06Q 10/00*    (2012.01)
*G06Q 10/06*    (2012.01)

(52) U.S. Cl.
CPC ......... *G06Q 10/06* (2013.01); *G06Q 10/0633* (2013.01)

(58) Field of Classification Search
CPC .......................................... G06Q 10/00–90/00
USPC ............................................... 705/7.11–7.42
See application file for complete search history.

(56) References Cited

U.S. PATENT DOCUMENTS

| | | | |
|---|---|---|---|
| 5,420,977 A * | 5/1995 | Sztipanovits et al. ........ 715/853 |
| 5,581,691 A * | 12/1996 | Hsu et al. ....................... 714/15 |
| 5,630,069 A | 5/1997 | Flores et al. |
| 5,826,239 A * | 10/1998 | Du ........................... G06Q 10/06 705/301 |
| 5,918,226 A * | 6/1999 | Tarumi et al. |
| 6,041,306 A * | 3/2000 | Du et al. ............................ 705/8 |
| 6,115,640 A * | 9/2000 | Tarumi ............................. 700/99 |
| 6,546,364 B1 * | 4/2003 | Smirnov et al. ................ 703/22 |
| 6,820,118 B1 * | 11/2004 | Leymann et al. ............ 709/223 |
| 6,826,579 B1 | 11/2004 | Leymann et al. |
| 6,968,343 B2 * | 11/2005 | Charisius et al. |
| 6,990,664 B2 | 1/2006 | Cheeniyil et al. |
| 7,024,669 B1 * | 4/2006 | Leymann et al. ............ 718/100 |
| 7,024,670 B1 | 4/2006 | Leymann et al. |
| 7,065,493 B1 | 6/2006 | Homsi |
| 7,295,950 B2 * | 11/2007 | Iyengar ................ G05B 23/024 340/500 |
| 7,409,671 B1 * | 8/2008 | Meredith et al. ............. 717/104 |

(Continued)

OTHER PUBLICATIONS

Definition of workflow (retrieved from http://computer.yourdictionary.com/workflow).*

(Continued)

*Primary Examiner* — Alan S Miller
(74) *Attorney, Agent, or Firm* — Steven M. Greenberg, Esq.; CRGO Law

(57) ABSTRACT

A method and apparatus for examining workflow processes can include monitoring system having a definition element that selectively defines one or more workflow process elements of a corresponding workflow, and a monitor element that identifies one or more monitoring parameters for each of the workflow process elements. The system can also include one or more operational aspects of the one or more workflow process elements according to corresponding definitions and monitoring parameters.

26 Claims, 3 Drawing Sheets

(56) References Cited

U.S. PATENT DOCUMENTS

| | | | |
|---|---|---|---|
| 7,467,145 B1* | 12/2008 | Castellanos | G06Q 10/06 |
| 2002/0040312 A1* | 4/2002 | Dhar et al. | 705/8 |
| 2002/0075293 A1* | 6/2002 | Charisius et al. | 345/704 |
| 2002/0138543 A1* | 9/2002 | Teng et al. | 709/102 |
| 2003/0181991 A1* | 9/2003 | Chau et al. | 700/1 |
| 2004/0034857 A1* | 2/2004 | Mangino | G06Q 10/06 |
| | | | 718/104 |
| 2004/0078105 A1* | 4/2004 | Moon et al. | 700/100 |
| 2004/0103014 A1* | 5/2004 | Teegan et al. | 705/8 |

OTHER PUBLICATIONS

Casati, Fabio, et al. "Specification and implementation of exceptions in workflow management systems." ACM Transactions on Database Systems (TODS) 24.3 (1999): 405-451.*

Duan, Rubing, Radu Prodan, and Thomas Fahringer. "Dee: A distributed fault tolerant workflow enactment engine for grid computing." International Conference on High Performance Computing and Communications. Springer Berlin Heidelberg, 2005.*

Buhler, Paul A., and José M. Vidal. "Towards adaptive workflow enactment using multiagent systems." Information technology and management 6.1 (2005): 61-87.*

\* cited by examiner

METHOD AND APPARATUS FOR EXAMINING WORKFLOW PROCESSES

FIELD OF THE DISCLOSURE

The present disclosure relates generally to workflow technologies, and more specifically to a method and apparatus for examining workflow processes.

BACKGROUND

In a commercial setting, it is often customary and efficient to define repeatable processes in a workflow. There are many software solutions for defining and creating automation workflows that are used by enterprise personnel to manage operations of a specific category. Although workflows have had a significant impact in improving commercial operations, it is often difficult to synthesize or interpret raw information associated with a number of monitored workflow processes.

A need therefore arises for a method and apparatus for examining workflow processes.

DETAILED DESCRIPTION

Embodiments in accordance with the present disclosure provide a method and apparatus for examining workflow processes.

In a first embodiment of the present disclosure, a computer-readable storage medium in a Workflow Monitoring System (WMS) can have computer instructions for selectively defining one or more workflow process elements of a corresponding workflow, identifying one or more monitoring parameters for each of the one or more workflow process elements selected, and monitoring one or more operational aspects of the one or more workflow process elements according to its corresponding one or more definitions and one or more monitoring parameters.

In a second embodiment of the present disclosure, a computer-readable storage medium can have computer instructions for submitting to a WMS information associated with one or more operational aspects of one or more workflow process elements of a workflow, wherein the WMS selectively defines the one or more workflow process elements of the workflow, identifies one or more monitoring parameters for each of the one or more workflow process elements selected, and monitors the one or more operational aspects of the one or more workflow process elements according to its corresponding one or more definitions and one or more monitoring parameters.

In a third embodiment of the present disclosure, a WMS can have a definition element that selectively defines one or more workflow process elements of a corresponding workflow, and a monitor element that identifies one or more monitoring parameters for each of the one or more workflow process elements selected, and monitors one or more operational aspects of the one or more workflow process elements according to its corresponding one or more definitions and monitoring parameters.

In a fourth embodiment of the present disclosure, a method can have the step of presenting a Graphical User Interface (GUI) for selectively defining one or more workflow process elements of a corresponding workflow, identifying one or more monitoring parameters for each of the one or more workflow process elements selected, and monitoring one or more operational aspects of the one or more workflow process elements according to its corresponding one or more definitions and one or more monitoring parameters.

Figure 1:
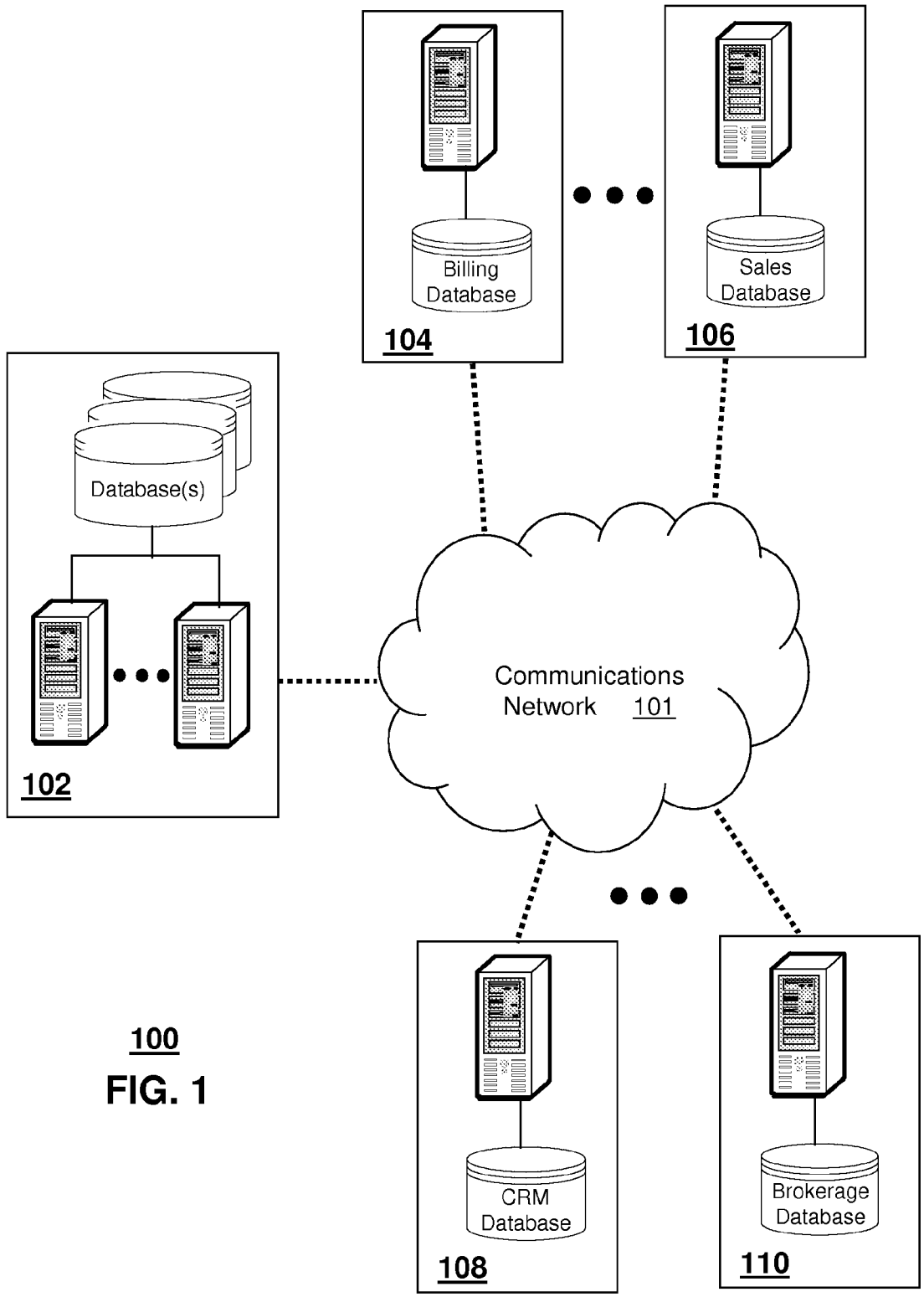
FIG. 1 depicts an exemplary embodiment of a communication system.

FIG. 1 depicts an exemplary embodiment of a communication system 100. The communication system 100 can comprise any number of computing systems 102-110 interconnected by way of a communications network 101. The communications network 101 can comprise common wired and wireless network elements that transfer data between the aforementioned computing systems 102-110. The network elements can utilize any common data protocol such as the Internet Protocol, and/or wireless data protocols such as WiMAX, GPRS, EVDO, and so on. The communications network 101 can utilized circuit-switched (e.g., Public Switched Telephone Network or PSTN) and/or packet-switched technologies for supporting voice, video and/or data exchanges.

Computing system 102 can serve as a Workflow Monitoring System (WMS) (herein referred to as WMS 102). The WMS 102 can be a centralized or decentralized set of computing devices as shown in FIG. 1. WMS 102 serves to monitor one or more operational aspects of workflow process elements defined according to a workflow. Operational aspects of a workflow process element can include without limitation metrics such as timing, performance, and productivity. Other operational metrics suitable to the present disclosure can also be used. A workflow process element can be represented by software, human, or other suitable process composed of one or more tasks that achieve an intended goal or objective with some or no human interaction. Tasks can include, for example, file transfers between workflow process elements, processing of said files by workflow process elements and/or by human agents, receiving a work product from a human agent, modifying/adding/updating said work product and forwarding it to a subsequent agent for further processing, and so on. Such tasks can apply to any discipline or industry (e.g., manufacturing, financial processing, insurance, accounts payable processing, accounts receivable processing, sales management, etc.). The type of tasks possible is innumerable and unlimited in scope in relation to the present disclosure.

Workflow process elements can be sequential, hierarchical, or combinations thereof. Additionally, workflow process elements can be centralized or distributed among a number of the computing systems 104-110. In the present illustration, computing systems 104-110 represent, respectively, a billing system, a sales force management system, a Customer Relationship Management (CRM) system, and a brokerage management system. A commercial enterprise can design computing systems 104-110 to manage portions of a workflow defined by said enterprise. It would be apparent to one of ordinary skill in the art that a workflow associated with other computing systems can be applied to the present disclosure. Accordingly, computing systems 104-110 are exemplary and are not intended to be limiting to the present disclosure.

Figure 2:
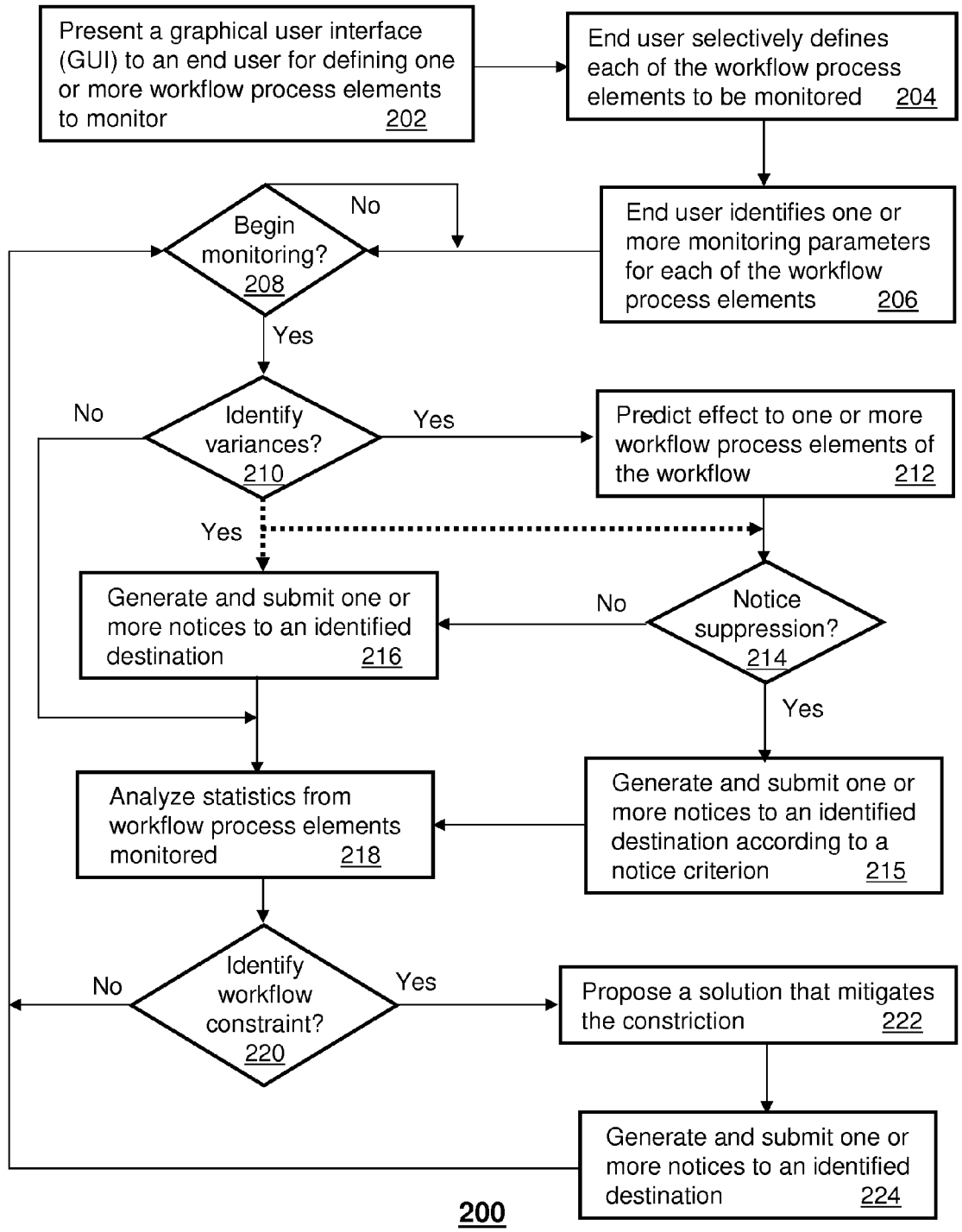
FIG. 2 depicts an exemplary method operating in the communication system.

FIG. 2 depicts an exemplary method 200 operating in the communication system 100. Method 200 can be applied to workflow process elements operated on by the computing systems 104-110 depicted in FIG. 1. In practice, a service provider managing WMS 102 can configure said system to monitor all or a portion of the workflow process elements that make up a particular workflow. Moreover, WMS 102 can be programmed to execute more than one instance of method 200 for portions of the same workflow or for a number of workflows.

With these principles in mind, method 200 begins with step 202 in which the WMS 102 presents a Graphical User Interface (GUI) to an end user for defining one or more workflow process elements that can be monitored. In step 204 the end user selectively defines each workflow process element to be monitored. A workflow process element can be defined by one or more access parameters comprising, for example, a process name (which can be broadly defined by a wildcard character), a functional description of said process, an IP address and port number given to access said process by way of the communication network 101, and a Personal Identification Number (PIN) or a user ID and/or password for validation and authentication. It would be appreciated by one of ordinary skill in the art that any access method can be applied to the present disclosure. A wildcard character can be used to broadly describe a group of related workflow process elements (e.g., abc* can represent all processes having a name that begins with "abc").

Workflow process elements can be further defined by the end user according to interdependencies in the workflow. These interdependencies can be used by WMS 102 to correlate workflow process elements and thereby determine effects therebetween when a workflow process element does not operate as expected. The correlated workflow process elements once defined can be presented in step 204 as a GUI that presents, for example, graphical representations of the workflows process elements being monitored and their interdependencies. It would be appreciated by one of ordinary skilled in the art that the GUI interface of method 200 can be removed without affecting the scope of operation of the present disclosure. In this alternative embodiment, information relating to workflow process elements to be monitored can be entered or retrieved from the WMS 102 by way of text files, voice synthesis and recognition operating in the WMS, or any other present or future input and retrieval methods.

With these definitions, one or more workflow process elements can be monitored according to one or more monitoring parameters presented in step 206. Monitoring parameters can be given by an end user for each workflow process element defined in step 204. Monitoring parameters can include without limitation an expected start time of a select workflow process element, an expected end time of the select workflow process element, an expected duration time of the select workflow process element, a recurrence schedule of the select workflow process element, a concurrence schedule of the select workflow process element, and/or a start schedule tolerance and end schedule tolerance of the select workflow process element. Start, end, and/or duration times are fundamental parameters for defining an expected behavior of a select workflow process element.

The recurrence schedule can be utilized in a complex workflow design in which a select workflow process element occurs more than once a day. A concurrence schedule can be utilized in a similar workflow in which a workflow process element can have several simultaneous operational instances. The start and end schedule tolerances can be utilized to define a range from which to begin and end monitoring of a workflow process element outside of its expected start and end times. These are but a few of the possible metrics by which a select workflow process element can be monitored. It would be apparent to one of ordinary skill in the art that other definable parameters for monitoring a workflow process element can be applied to the present disclosure.

In accordance with the aforementioned one or more definitions and monitoring parameters, the WMS 102 can be programmed to proceed to step 208 where it determines when to begin the monitoring process. If an expected start time arrives (or a start tolerance is given) for a select workflow process element, the WMS 102 begins to monitor said process utilizing the access parameters given in step 204. According to the monitoring parameters, the WMS 102 determines in step 210 whether said process performs within the operating metrics given in step 206 (e.g., meets or exceeds expected start time, meets or exceeds expected duration, meets or exceeds expected end time, and so on).

The WMS 102 can determine the performance of a process by accessing said process by way of the communications network 101 and by monitoring activities performed by said process. Alternatively, the process may be a human event performed by a human operator. In this instance, if the human operator interacts with an automated process, monitoring of said process can be sufficient to measure the performance of the human operator. If the human operator does not interact with an automated process (e.g., a field technician performing tasks without automation), the performance of said human operator may require the operator to report in his/her start time, duration, and end times to another operator that enters this information in an automated process monitored by the WMS 102. Alternatively, the WMS 102 can monitor a workflow process element by accessing a file which includes operating statistics associated with said workflow process element. Said file can be created by the workflow process element being monitored or some other application associated therewith. An artisan with ordinary skill in the art would appreciate that any configuration (manual and/or automated) can be monitored by the WMS 102 so long as performance information associated with a particular workflow process element is somehow supplied thereto.

Once the performance information is retrieved by the WMS 102, if a variance is detected, the WMS 102 can proceed to step 212 where it predicts an effect to on one or more downstream workflow process elements according to the correlation information given in step 204. For example, if a workflow process element ends later than expected it can have an effect on downstream workflow process elements. In this instance, the WMS 102 can proceed to step 214 where it checks if notice suppression is active. If so, it proceeds to step 215 where it generates and submits one or more notices to an identified destination according to a notice criterion given by the end user in step 206. Otherwise, the WMS 102 proceeds to step 216 where it generates and submits notice messages to the destination without suppression.

Notices can include information associated with the predicted effect detected in step 212, which in the above example can be a delay in downstream workflow process elements due to a greater than expected ending of the affected workflow process element. In a supplemental embodiment, the WMS 102 can be programmed to analyze the predicted effect and propose one or more mitigating solutions. For instance, a downstream effect on sequential workflow process elements can be mitigated if one or more downstream workflow process elements are completed sooner than expected by a calculable amount. Alternatively, if it is possible to activate one or more concurrent workflow process elements to alleviate delay downstream, such proposal can also be made. These proposals can also be transmitted as part of the notices referred to above.

The identified destination for said notices can be a human agent, or an automated system that manages the workflow which can dynamically act upon the mitigation proposals. Any number of techniques can be used for transmitting notices such as, for example, email, wireless messages, signaling between computing devices, and so on.

As noted earlier, notices can be suppressed by a given notice criterion. Additionally, a prediction element, notification element or computer instructions can be used for suppressing a portion of the one or more notice messages according to a notice criterion. The notice criterion can specify any number of notice suppression techniques. For example, an end user may only care to receive notice of a detected variance at the front-end of an affected workflow rather than all of the subsequently affected processes. Such a suppression technique can be applied in a sequential design in which as one process performs below expectation other downstream processes are affected (similar to a domino effect). This technique can help to significantly reduce the number of notices submitted by the WMS 102 when the number of downstream workflow process elements is known to be large.

Alternatively, the end user can define the notice criterion so that all notices generated from a variance that affects downstream workflow process elements are transmitted on a single occurrence (such as a "fire once" technique). This method can be combined with the previous method in which all notices are transmitted once, and thereafter only a notice for only the first affected workflow process element is transmitted. It would be apparent to one of ordinary skill in the art that a notice criterion as utilized in the present disclosure can be defined any number of ways to achieve a desired alerting method.

Referring back to step 210, the WMS 102 can alternatively be programmed to make no predictions and simply generate and transmit in step 216 notices for variance(s) detected for each workflow process element. Accordingly, in this embodiment steps 212-214 can be removed. In another embodiment, the WMS 102 can be programmed to proceed from step 210 to 214 and perform notice suppressions (if activated) as previously discussed without predictions. In yet another embodiment, the WMS 102 can be programmed in step 218 to analyze statistics from workflow process elements monitored. Utilizing common statistical techniques, the WMS 102 can be programmed to identify in step 220 a constriction in one or more workflow process elements monitored. The identification step can represent a detection and/or prediction of a constriction. From an operations management point of view, a constriction can represent a "bottleneck" in processing capacity of one or more workflow process elements. As the rate of flow of processing in a defined workflow increases, one or more workflow process elements of the workflow may not be able to keep up with said rate, thereby creating a "bottleneck" effect can cause the variances described earlier.

Utilizing common principles of operations management, the WMS 102 can be programmed to utilize statistical information from the workflow process elements to predict or detect when such bottlenecks are about to occur or have occurred. In either case, the WMS 102 can be programmed in step 222 to propose a solution that mitigates the constriction. The solution can also be derived from common operations management techniques which propose replacement of a workflow process element with one of higher capacity (this could represent, for example, replacing server hardware, a manufacturing element, a human operator, etc.) or by paralleling workflow process elements to divide the labor and thereby relieve the bottleneck. Such proposals can be transmitted in step 224 as notices to the identified destination mentioned earlier which can act upon the proposed solution through automation or at a later time by way of a human agent responsible for managing the performance of the workflow. Whether or not a constraint is identified, the WMS 102 is programmed to continue monitoring the workflow process elements from step 208 as previously described. If a new monitoring structure is to be defined or an existing one is to be updated, the WMS 102 can be programmed to proceed to step 202 as described earlier.

The aforementioned method 200 provides a flexible means to selectively monitor workflow process elements in a defined workflow. Method 200 is a substantial improvement over methods which simply collect raw data from workflow process elements and leave it up to an end user to synthesize said data. Moreover, by correlating workflow process elements, method 200 provides a unique means to interpret operational aspects of workflow process elements in general.

Upon reviewing the aforementioned embodiments of the present disclosure, it would be evident to an artisan with ordinary skill in the art that said embodiments can be modified, reduced, or enhanced without departing from the scope and spirit of the claims described below. For example, the prediction steps can utilize any number of probabilistic and statistical techniques to perform the functions noted above as well as other functions not addressed in this disclosure. Alternatively, all prediction steps described by method 200 can be removed without affecting the scope of the disclosure. Additionally, method 200 need not present a GUI interface to an end user for entering or presenting information. These are but a few examples of modifications that can be applied to the present disclosure without departing from the scope of the claims stated below. Accordingly, the reader is directed to the claims section for a fuller understanding of the breadth and scope of the present disclosure.

Figure 3:
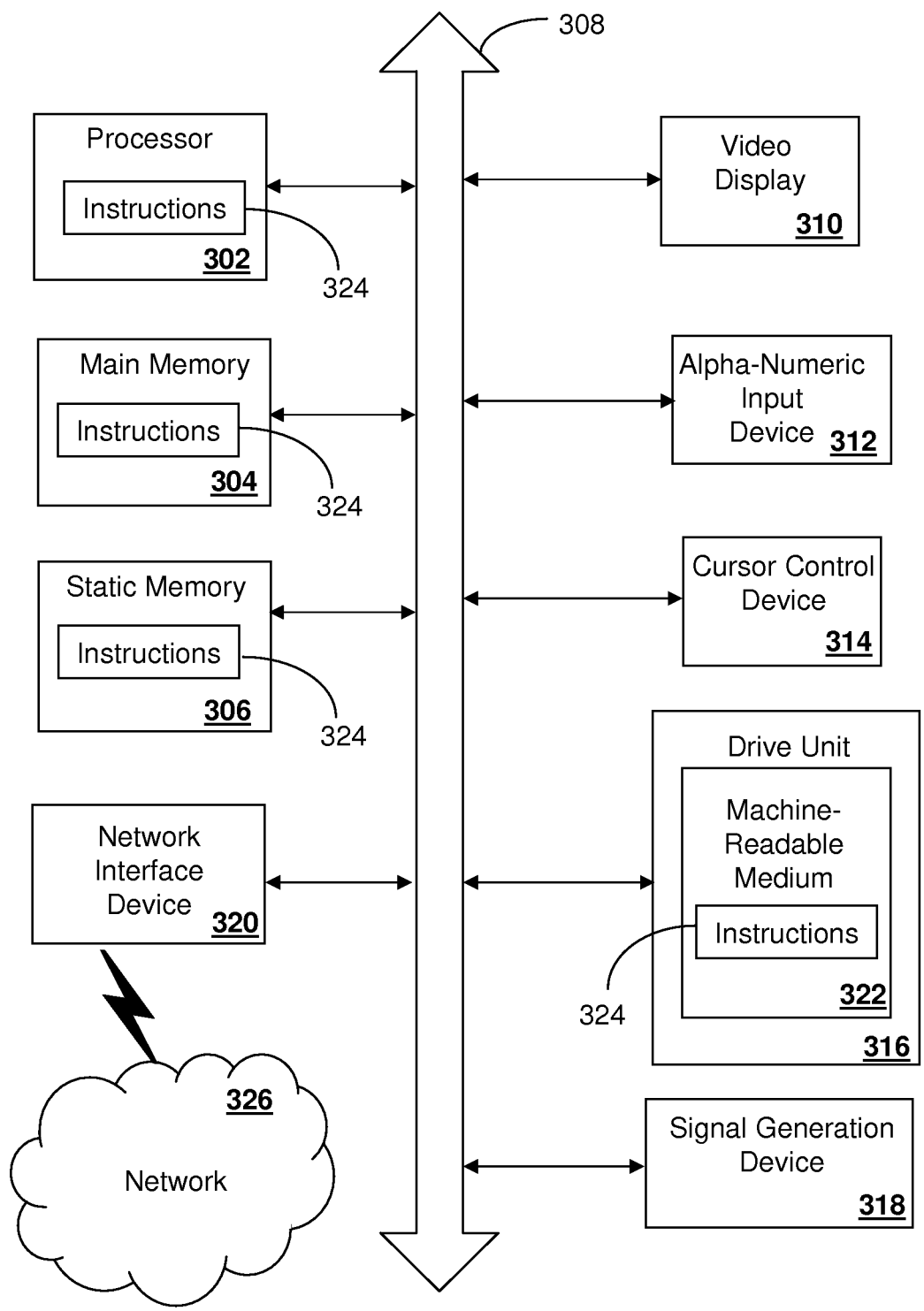
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a workflow monitoring system, comprising computer instructions which when executed by a processor, cause a computer to:
   receive a plurality of workflow process element definitions respectively corresponding to definitions for a plurality of workflow process elements;
   receive interdependency data indicative of interdependencies among and between the workflow process elements of the plurality of workflow process elements; and
   receive monitoring information relating to a first instantiation of a workflow including a sub-set of the plurality of workflow process elements, with the monitoring information indicating performance of a first workflow process element of the sub-set of the plurality of workflow process elements included in the first instantiation;
   detect an unexpected variance between the indicated performance and a pre-stored expected performance of the workflow process elements; and
   predict, by machine logic and based, at least in part, upon the interdependency data, a predicted effect on performance of a second workflow process element of the first instantiation, with the second workflow process element being in the workflow downstream from the first workflow process element.

2. The non-transitory computer-readable storage medium of claim 1, wherein the workflow process elements are defined according to at least one access parameter.

3. The non-transitory computer-readable storage medium of claim 2, wherein the at least one access parameters comprises at least one among a name of a select workflow process element, a functional description of the select workflow process element, an Internet Protocol address, a port number, a Personal Identification Number, a user ID, and a password.

4. The non-transitory computer-readable storage medium of claim 1, wherein the monitoring information corresponds to at least one among an expected start time of a selected workflow process element, an expected end time of the selected workflow process element, and an expected duration time of the selected workflow process element.

5. The non-transitory computer-readable storage medium of claim 4, comprising computer instructions, that when executed by the processor, cause the computer to detect the variance in at least one among the expected start time, end time and duration of the selected workflow process element.

6. The non-transitory computer-readable storage medium of claim 1, comprising computer instructions, that when executed by the processor, cause the computer to generate at least one notice message associated with the predicted effect.

7. The non-transitory computer-readable storage medium of claim 6, comprising computer instructions, that when executed by the processor, cause the computer to suppress a portion of the at least one notice messages according to a notice criterion from the inputs entered into the computer.

8. The non-transitory computer-readable storage medium of claim 6, comprising computer instructions, that when executed by the processor, cause the computer to submit the at least one notice messages to an identified destination.

9. The non-transitory computer-readable storage medium of claim 4, wherein the monitoring information further corresponds to a recurrence schedule of the select workflow process element.

10. The non-transitory computer-readable storage medium of claim 4, wherein the monitoring information further corresponds to a concurrence schedule of the selected workflow process element.

11. The non-transitory computer-readable storage medium of claim 4, wherein the monitoring information further corresponds to at least one among a start and end schedule tolerance of the selected workflow process element.

12. The non-transitory computer-readable storage medium of claim 4, comprising computer instructions, that when executed by the processor, cause the computer to:
   detect the variance in at least one among the expected start time, end time and duration of the selected workflow process element; and
   generate at least one notice message associated with the variance.

13. The non-transitory computer-readable storage medium of claim 12, comprising computer instructions, that when executed by the processor, cause the computer to suppress a portion of the at least one notice message according to a notice criterion.

14. The non-transitory computer-readable storage medium of claim 1, comprising computer instructions, that when executed by the processor, cause the computer to define each of the portion of workflow process elements according to one or more identifiers each incorporating one or more wildcard characters.

15. A workflow monitoring system, comprising:
   a data store comprising a plurality of workflow process definitions in a computer respectively corresponding to definitions for a plurality of workflow process elements and interdependency data indicative of interdependencies among and between the workflow process elements of the plurality of workflow process elements;
   a monitor element in the computer that identifies monitoring information relating to a first instantiation of a workflow including a sub-set of the plurality of workflow process elements, with the monitoring information indicating performance of a first workflow process element of the sub-set of the plurality of workflow process elements included in the first instantiation; and,
   a Graphical User Interface (GUI) element in the computer that detects an unexpected variance between the indicated performance and a pre-stored expected performance of the workflow process element, and predicts based, at least in part, upon the interdependency data, a predicted effect on performance of a second workflow process element of the first instantiation, with the second workflow process elements being in the workflow downstream from the first workflow process element.

16. The workflow monitoring system of claim 15, wherein the Graphical User Interface element further generates a Graphical User Interface representing correlated workflow process elements.

17. The workflow monitoring system of claim 15, comprising a communications element that defines each of the workflow process elements according to at least one access parameter, wherein the at least one access parameter comprises at least one among a name of a select workflow process element, a functional description of the select workflow process element, an Internet Protocol address, a port number, a Personal Identification Number, a user ID, and a password.

18. The workflow monitoring system of claim 15, wherein the monitoring information corresponds to at least one among an expected start time of a selected workflow process element, an expected end time of the selected workflow process element, an expected duration time of the selected workflow process element, a recurrence schedule of the selected workflow process element, a concurrence schedule of the selected workflow process element, and at least one among a start and end schedule tolerance of the selected workflow process element.

19. The workflow monitoring system of claim 18, comprising a prediction element that detects a variance in at least one among the expected start time, end time and duration of the selected workflow process element, predicts from the variance an effect to one or more downstream workflow process elements based upon the identified dependencies for each of the workflow process elements, generates at least one notice message associated with the predicted effect, suppresses a portion of the at least one notice message according to a notice criterion, and submits the at least one notice message to an identified destination.

20. The workflow monitoring system of claim 18, comprising a notification element that detects a variance in at least one among the expected start time, end time and duration of the selected workflow process element, generates at least one notice message associated with the variance, and suppresses a portion of the at least one notice message according to a notice criterion.

21. The workflow monitoring system of claim 20, wherein the suppression limits a number of instances for submitting the at least one notice message to an identified destination.

22. The workflow monitoring system of claim 15, wherein a group of related workflow process elements are defined according to an identifier incorporating a wildcard character.

23. The workflow monitoring system of claim 15, comprising an analysis element that detects a constriction in at least one of the workflow process elements, and proposes a solution to mitigate the constriction.

24. The workflow monitoring system of claim 15, comprising an analysis element that predicts a constriction in at least one of the workflow process elements, and proposes a solution to mitigate the constriction.

25. The workflow monitoring system of claim 15, comprising an analysis element that detects a variance from at least one monitoring parameter in the monitoring information associated with one or more workflow process elements, generates at least one notice message proposing a solution that mitigates an effect caused by a workflow process elements experiencing the variance.

26. The workflow monitoring system of claim 15, wherein the workflow process elements correspond to at least one among an accounts receivable system, an accounts payable system, a sales management system, a financial management system, and a customer relations management system.

* * * * *